March 26, 1963 R. BIRD 3,083,260
ELECTRICAL WIRE CONNECTORS
Filed Feb. 21, 1961

INVENTOR.
BY Ruth Bird
S. Stephen Baker
ATTORNEY

United States Patent Office 3,083,260
Patented Mar. 26, 1963

3,083,260
ELECTRICAL WIRE CONNECTORS
Ruth Bird, 132 E. Main St., Bayshore, N.Y.
Filed Feb. 21, 1961, Ser. No. 90,746
3 Claims. (Cl. 174—87)

This invention relates to electrical connectors and more particularly to a connector which, in effect, solders electrical wires inserted therein without the application of heat.

Plastic cups in which are manually inserted and physically retained, electrical wires are in common usage. It is often a requirement that the wires be effectively soldered as well as mechanically twisted. The usual practise is to twist the wires, solder them and then insert them into the plastic cup. This is obviously not only a time consuming operation but is sometimes completely impractical as when soldering tools or equipment are unavailable.

With the foregoing in mind I have devised a cup or body member which incorporates a supply of electrically conductive metal cement in plastic form. Such cement ordinarily drys hard unless it is sealed from air. My device includes a seal by which the cement is maintained plastic or semi-solid. The seal is such that it may be penetrated by the wires to be soldered. Thus, at the same time that the wires are introduced into the cement filled body, the air is given access to the cement so that the wires may become securely soldered within the device, the hardened cement serving as solder. The body of the device is internally grooved in order to firmly retain the mass of hardened cement or solder with the wires embedded therein.

The invention will be further understood from the following description and drawings in which.

Figure 1:
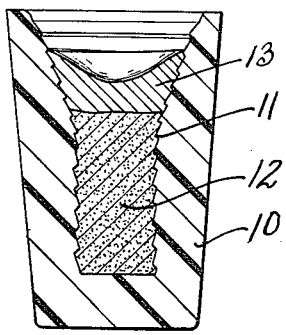
FIGURE 1 is a longitudinal cross-sectional view of an electrical wire connector and taken along the line 1—1 of FIGURE 2.
Figure 2:
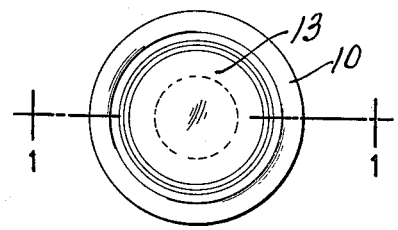
FIGURE 2 is a top plan view.

The connector comprises a cup-shaped body 10 having an open upper end, the body by itself, being well known in the electrical art. Body 10 may be formed of thermoplastic material although this is not necessary to the practise of the invention. Its internal surface is grooved throughout so as to form annular teeth 11. Teeth 11 point generally downwardly as shown in order to better retain the metal cement as will be hereinafter explained.

Housed within body 10 is a mass of metal cement or metal putty 12. Such cement may be the well-known plastic steel in putty form such as is sold under the registered trademark Duro as manufactured by The Woodhill Chemical Co., Cleveland, Ohio. This product comprises metal powder in an adhesive carrier containing a solvent which solvent evaporates when exposed to air. Ordinarily the cement is sold in collapsible tubes. It is applied cold and upon exposure to air, the cement hardens into an integral mass. However, any liquid or semi-solid soldering substance may be employed.

In the article of this invention, in order to hermetically seal the cement 12 from the atmosphere a layer of film of air-impermeable substance 13 is deposited or formed over the cement 12 while the cement is in non-hardened, plastic form. Layer or film 13 may be of ordinary household paraffin such as is used in sealing fruit jars.

Figure 3:
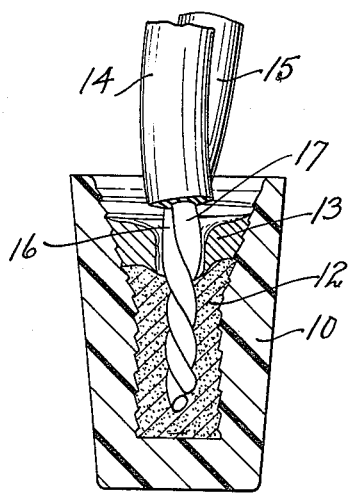
FIGURE 3 is a cross-sectional view illustrating the introduction and bonding of the wires within the connector.

The invention is utilized as indicated in FIGURE 3. Thus two wires 14 and 15 will have their respective metal conductors 16 and 17 twisted together as illustrated. The twisted conductors are then simply pushed through the film of paraffin 13 whereupon they become deposited and embedded in the mass 12. This action of course, then permits air to reach the mass 12 which will subsequently harden in a short time. Accordingly, the two wire conductors 16 and 17 will be effectively soldered or at least firmly and securely bonded and maintained in position by the hardened cement. Of course, more or less than the two conductors may be accommodated as desired.

Figure 4:
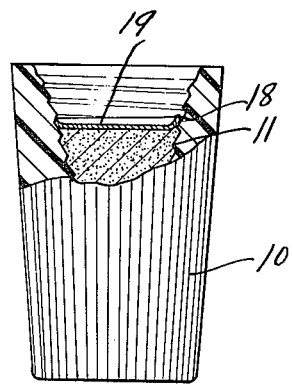
FIGURE 4 is an elevational, partly broken away view of a modified embodiment.

Referring to FIGURE 4, the construction of the body 10 is the same as that described above. It will be observed that the annular teeth 11 form corresponding ledges 18. A disk 19 comprising aluminum foil is seated on a ledge 18 so as to perform the same function as the layer 13. Film 19 may be adhered to a ledge 18 by any suitable adhesive. On the other hand, when body 10 is thermo-plastic, aluminum foil 19 may be heated to 200°–300° (depending upon the softening point of the plastic) and firmly pressed down so as to provide the required hermetic seal. The wire conductors 16 and 17 will pierce the film 19 in the same manner as described above.

It will be seen from the foregoing that I have provided a cup-shaped electrical connector body which can effectively solder wires inserted therein and only requiring that a hermetic seal be ruptured or punctured by the wires themselves. The metal cement 12 is electrically conductive although this characteristic is not strictly necessary toward the practise of the invention since it will nevertheless make the bonded connection more secure whether it is conducting or not. However, the invention works best when the cement is electrically conductive in the same manner as conventional solder.

There has been shown what is now considered a preferred embodiment of the invention but it is obvious that numerous changes and omissions may be made without departing from its spirit.

What is claimed is:

1. A wire connector comprising a body of electrically insulating material, said body having an open upper end, said body being substantially filled with electrically conductive metal cement in semi-solid form, said cement being such as to harden on exposure to air, and a film hermetically sealing said upper end, said film being rupturable whereupon said cement will be caused to harden into an integral mass, said body being hollow and formed on its inner surface with grooves for securely gripping the hardened mass, and one of said grooves taking the form of downwardly directed teeth, at least one of said grooves forming an upper shelf, said film being hermetically sealed on said upper shelf.

2. A wire connector comprising a body of electrically insulating material having an open upper end, said body being substantially filled with electrically conductive metal cement in semi-solid form, said cement being such as to harden on exposure to air, and a film hermetically sealing said upper end, said film being rupturable whereupon said cement will be caused to harden into an integral mass, said film being a layer of paraffin overlying said cement.

3. A wire connector comprising a body of electrically insulating material, said body, having an open upper end, said body being substantially filled with a quantity of metal cement in semi-solid form, said cement being such as to harden on exposure to air, and a film hermetically sealing said upper end, said film being rupturable whereupon said cement will be caused to harden into an integral mass, said film being a metal foil, and a ledge within said body on which said foil is secured, said body and ledge being thermoplastic and said foil being heat sealed against said ledge.

(References on following page)

References Cited in the file of this patent

UNITED STATES PATENTS

| | | |
|---|---|---|
| 583,589 | Austin | June 1, 1897 |
| 997,066 | Krannichfeldt | July 4, 1911 |
| 1,700,985 | Jasper | Feb. 5, 1929 |
| 1,726,991 | Lundy | Sept. 3, 1929 |
| 2,749,384 | Scott | June 5, 1956 |
| 2,802,044 | Corne | Aug. 6, 1957 |

FOREIGN PATENTS

| | | |
|---|---|---|
| 164,334 | Great Britain | Sept. 4, 1922 |
| 235,963 | Germany | June 24, 1911 |

OTHER REFERENCES

Hyde: Abstract of application Serial No. 206,902, published May 20, 1952, O.G. 918.

Publication I, "Higher Conductivity With Blackburn," published in Electrical World, April 21, 1958, (page 10 relied on).